United States Patent
Jung et al.

(10) Patent No.: US 9,557,613 B2
(45) Date of Patent: Jan. 31, 2017

(54) LIQUID CRYSTAL DISPLAY HAVING REDUCED IMAGE QUALITY DETERIORATION AND AN IMPROVED VIEWING ANGLE, AND A METHOD OF DRIVING THE SAME

(71) Applicant: Samsung Display Co., Ltd., Yongin, Gyeonggi-do (KR)

(72) Inventors: Jae-Hoon Jung, Incheon (KR); Hoon Kim, Asan-si (KR); Cheol Shin, Hwaseong-si (KR); Ka Eun Kim, Seoul (KR); Su Jeong Kim, Seoul (KR); Ki Chul Shin, Suwon-si (KR); Ho Kil Oh, Asan-si (KR); Min Ju Han, Seoul (KR); Dan Bi Yang, Gyeonggi-do (KR); Ji Phyo Hong, Pyeongtaek-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 735 days.

(21) Appl. No.: 13/829,656

(22) Filed: Mar. 14, 2013

(65) Prior Publication Data
US 2013/0335688 A1    Dec. 19, 2013

(30) Foreign Application Priority Data
Jun. 13, 2012 (KR) .......................... 10-2012-0063087

(51) Int. Cl.
G02F 1/1343 (2006.01)
G02F 1/1362 (2006.01)
G02F 1/1337 (2006.01)

(52) U.S. Cl.
CPC ....... *G02F 1/134336* (2013.01); *G02F 1/1337* (2013.01); *G02F 1/13624* (2013.01); *G02F 2001/134345* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,737,051 A | * | 4/1998 | Kondo | G02F 1/134363 349/149 |
| 6,356,335 B1 | * | 3/2002 | Kim | G02F 1/133345 349/129 |

(Continued)

FOREIGN PATENT DOCUMENTS

| | | |
|---|---|---|
| JP | 3656827 | 3/2005 |
| JP | 4394512 | 10/2009 |

(Continued)

*Primary Examiner* — Joseph Feild
*Assistant Examiner* — Karin Kiyabu
(74) *Attorney, Agent, or Firm* — F. Chau & Associates, LLC (57) ABSTRACT

A liquid crystal display includes a first substrate, a pixel electrode formed on the first substrate, a second substrate facing the first substrate, and a common electrode formed on the second substrate. The pixel electrode includes a first subpixel electrode disposed in a first subpixel region, and a second subpixel electrode disposed in a second subpixel region. A first voltage applied to the first subpixel electrode and a second voltage applied to the second subpixel electrode are different from each other, and a ratio of the first voltage to the second voltage is about 0.76 to about 0.80.

13 Claims, 9 Drawing Sheets

(56) References Cited

U.S. PATENT DOCUMENTS

| | | | |
|---|---|---|---|
| 6,680,769 B1* | 1/2004 | Lee | G02F 1/133707 349/129 |
| 7,358,948 B2 | 4/2008 | Shiomi et al. | |
| 7,697,097 B2 | 4/2010 | Yakovenko et al. | |
| 7,714,966 B2 | 5/2010 | Ishii | |
| 7,773,169 B2 | 8/2010 | Song | |
| 7,787,092 B2 | 8/2010 | Mizusako et al. | |
| 8,810,761 B2* | 8/2014 | Park | G02F 1/133707 349/129 |
| 8,902,386 B2* | 12/2014 | Kwon | G02F 1/133707 349/129 |
| 9,046,712 B2* | 6/2015 | Kim | G02F 1/133707 |
| 9,366,917 B2* | 6/2016 | Kwon | G02F 1/133707 |
| 2005/0162598 A1* | 7/2005 | Choi | G02F 1/1337 349/139 |
| 2005/0280761 A1* | 12/2005 | Ishii | G02F 1/133707 349/130 |
| 2010/0007834 A1* | 1/2010 | Song | G02F 1/133707 349/129 |
| 2010/0157184 A1 | 6/2010 | Ong | |
| 2010/0283954 A1* | 11/2010 | Song | G02F 1/133707 349/130 |
| 2011/0242468 A1* | 10/2011 | Choi | C08G 8/12 349/129 |
| 2012/0105785 A1 | 5/2012 | Kim et al. | |
| 2013/0201432 A1* | 8/2013 | Yun | G02F 1/134309 349/123 |
| 2015/0029430 A1* | 1/2015 | Song | G02F 1/133707 349/43 |
| 2015/0198855 A1* | 7/2015 | Kim | G02F 1/141 349/33 |

FOREIGN PATENT DOCUMENTS

| | | |
|---|---|---|
| JP | 2010-128045 | 6/2010 |
| KR | 1019990079740 | 11/1999 |
| KR | 1019990079742 | 11/1999 |
| KR | 1019990079743 | 11/1999 |
| KR | 1019990079744 | 11/1999 |
| KR | 1019990079747 | 11/1999 |
| KR | 1019990079748 | 11/1999 |
| KR | 100273717 | 9/2000 |
| KR | 100292372 | 3/2001 |
| KR | 100296976 | 5/2001 |
| KR | 1020010063302 | 7/2001 |
| KR | 100462181 | 12/2004 |
| KR | 1020110111212 | 10/2011 |
| KR | 1020130055989 | 5/2013 |

* cited by examiner

FIG.10

LIQUID CRYSTAL DISPLAY HAVING REDUCED IMAGE QUALITY DETERIORATION AND AN IMPROVED VIEWING ANGLE, AND A METHOD OF DRIVING THE SAME

CROSS-REFERENCE TO RELATED APPLICATION

This application claims priority under 35 U.S.C. §119 to Korean Patent Application No. 10-2012-0063087, filed on Jun. 13, 2012, the disclosure of which is incorporated by reference herein in its entirety.

TECHNICAL FIELD

The present invention relates to a liquid crystal display, and a method of driving a liquid crystal display.

DISCUSSION OF THE RELATED ART

A liquid crystal display typically includes two display panels including field generating electrodes such as a pixel electrode and a common electrode, and a liquid crystal layer interposed therebetween. An electric field is generated in the liquid crystal layer by applying a voltage to the field generating electrodes. The electric field determines the direction of liquid crystal molecules of the liquid crystal layer, and controls polarization of incident light through the generated electric field, thus displaying images.

A vertically aligned (VA) mode liquid crystal display is a liquid crystal display in which long axes of liquid crystal molecules are vertically aligned in the absence of an electric field. A VA mode liquid crystal display may have a high contrast ratio and a wide standard viewing angle. A standard viewing angle may refer to a viewing angle or a luminance reverse critical angle between grays having a contrast ratio of 1:10.

In a VA mode liquid crystal display, one pixel may be divided into two subpixels, and different voltages may be applied to the two subpixels. Applying different voltages to the two sub pixels results in the transmittance of the two subpixels being different, which may widen a narrow viewing angle. However, this may also result in the transmittance of light being deteriorated in the middle gray level, thus deteriorating image quality of the display.

SUMMARY

Exemplary embodiments of the present invention provide a liquid crystal display in which there is little or no change in the transmittance in a predetermined gray level. Exemplary embodiments further provide a liquid crystal display having reduced image quality deterioration, and an improved viewing angle.

An exemplary embodiment of the present invention provides a liquid crystal display including a first substrate, a pixel electrode formed on the first substrate, a second substrate facing the first substrate, and a common electrode formed on the second substrate. The pixel electrode includes a first subpixel electrode disposed in a first subpixel region, and a second subpixel electrode disposed in a second subpixel region. A first voltage applied to the first subpixel electrode and a second voltage applied to the second subpixel electrode are different from each other, and a ratio of the second voltage to the first voltage is about 0.76 to about 0.80.

In an exemplary embodiment, the ratio of the second voltage to the first voltage is about 0.77 to about 0.79.

In an exemplary embodiment, an area of the second subpixel region is about 1.5 times as large as an area of the first subpixel region.

In an exemplary embodiment, the liquid crystal display further includes a liquid crystal layer injected between the first substrate and the second substrate, wherein liquid crystal molecules of the liquid crystal layer are arranged such that they are approximately vertical to surfaces of the first substrate and the second substrate when an electric field is not formed between the pixel electrode and the common electrode.

In an exemplary embodiment, the liquid crystal display further includes an alignment layer disposed on at least one of the first substrate and the second substrate, wherein at least one of the liquid crystal layer and the alignment layer include a photoreactive material.

In an exemplary embodiment, the common electrode includes a first cutout having a cross shape disposed in a region corresponding to the first subpixel electrode.

In an exemplary embodiment, the first subpixel electrode includes a second cutout formed along an edge of the first subpixel electrode.

In an exemplary embodiment, the second subpixel electrode includes a plurality of third cutouts, the common electrode includes a plurality of fourth cutouts disposed in a region corresponding to the second subpixel electrode, and the third cutout and the fourth cutout are alternately disposed.

According to exemplary embodiments of the present invention, in a liquid crystal display, the change in transmittance at a predetermined gray level may be smooth, and periods including no change in transmittance or rapid changes in transmittance may be reduced or prevented. For example, deterioration of image quality may be reduced or prevented, and/or the viewing angle of the display may be improved by dividing one pixel into two pixel electrodes, and controlling a ratio of the voltage applied to a second subpixel electrode (e.g., a relatively low voltage) to the voltage applied to a first subpixel electrode (e.g., a relatively high voltage) to about 0.76 to about 0.80, and more specifically, to about 0.77 to about 0.79.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Exemplary embodiments of the present invention will be described more fully hereinafter with reference to the accompanying drawings. Like reference numerals may refer to like elements throughout the accompanying drawings.

Figure 1:
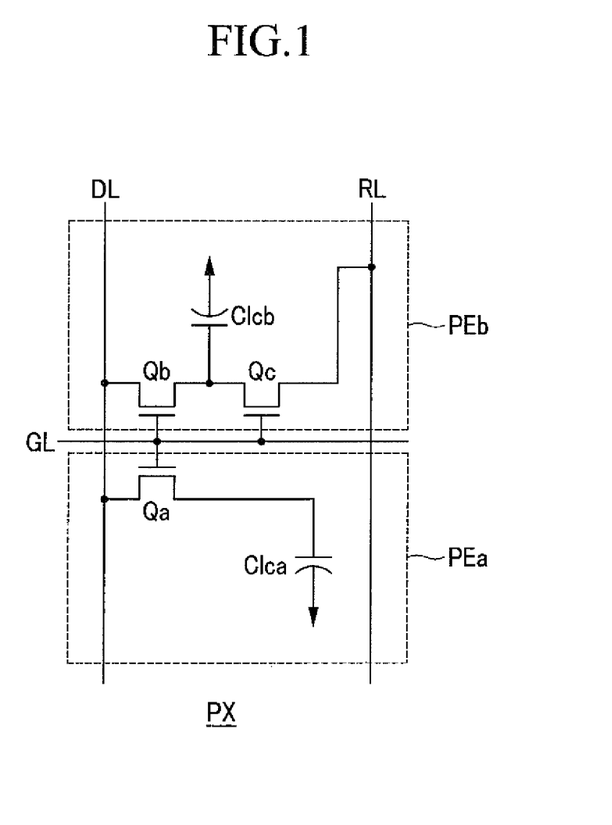
FIG. 1 is an equivalent circuit diagram of one pixel of a liquid crystal display, according to an exemplary embodiment of the present invention.

FIG. 1 is an equivalent circuit diagram for one pixel of a liquid crystal display, according to an exemplary embodiment of the present invention.

Referring to FIG. 1, one pixel PX of the liquid crystal display includes a gate line GL through which a gate signal is transferred, a data line DL through which a data signal is transferred, a plurality of signal lines including a reference voltage line RL through which a partial reference voltage is transferred, a first switching element Qa, a second switching element Qb and a third switching element Qc connected to a plurality of signal lines, a first liquid crystal capacitor Clca, and a second liquid crystal capacitor Clcb.

The first switching element Qa and the second switching element Qb are connected to the gate line GL and the data line DL, respectively. The third switching element Qc is connected to an output terminal of the second switching element Qb and the reference voltage line RL.

The first switching element Qa and the second switching element Qb may each be a three terminal element such as, for example, a thin film transistor. Hereinafter, the first, second, and third switching elements Qa, Qb, and Qc may be referred to as first, second, and third thin film transistors Qa, Qb, and Qc, respectively. A control terminal of the first and second switching elements Qa and Qb is connected to the gate line GL, an input terminal of the first and second switching elements Qa and Qb is connected to the data line DL, an output terminal of the first switching element Qa is connected to the first liquid crystal capacitor Clca, and the output terminal of the second switching element Qb is connected to the second liquid crystal capacitor Clcb and the input terminal of the third switching element Qc.

The third switching element Qc may also be a three terminal element such as, for example, a thin film transistor. The control terminal of the third switching element Qc is connected to the gate line GL, the input terminal of the third switching element Qc is connected to the second liquid crystal capacitor Clcb, and the output terminal of the third switching element Qc is connected to the reference voltage line RL.

When a gate-on signal is applied to the gate line GL, the first switching element Qa, the second switching element Qb, and the third switching element Qc connected to the gate line GL are turned on. Accordingly, the data voltage applied to the data line DL is applied to the first subpixel electrode PEa and the second subpixel electrode PEb through the turned-on first and second switching elements Qa and Qb. In this case, the data voltages applied to the first and second subpixel electrodes PEa and PEb may be charged by the same value. According to an exemplary embodiment of the present invention, the voltage applied to the second subpixel electrode PEb becomes a partial voltage through the third switching element Qc connected to the second switching element Qb in series. Accordingly, the voltage applied to the second subpixel electrode PEb becomes smaller than the voltage applied to the first subpixel electrode PEa. In this case, the ratio of the voltage applied to the second subpixel electrode PEb to the voltage applied to the first subpixel electrode PEa may be between about 0.76 and about 0.80, and more specifically, between about 0.77 and about 0.79. The area of the second subpixel region where the second subpixel electrode PEb is disposed may be larger than the area of the first subpixel region where the first subpixel electrode PEa is disposed. For example, in an exemplary embodiment, the area of the second subpixel region may be about 1.5 times as large as the area of the first subpixel region.

Accordingly, the voltage charged in the first liquid crystal capacitor Clca and the voltage charged in the second liquid crystal capacitor Clcb become different from each other. Since the voltage charged in the first liquid crystal capacitor Clca and the voltage charged in the second liquid crystal capacitor Clcb are different from each other, inclination angles of liquid crystal molecules in the first subpixel and the second subpixel become different from each other. As a result, the luminance of each of the two subpixels becomes different. Accordingly, in an exemplary embodiment, appropriately controlling the voltage charged in the first liquid crystal capacitor Clca and the voltage charged in the second liquid crystal capacitor Clcb may allow for a narrow viewing angle of the liquid crystal display to be widened, and thus, improved.

Figure 2:
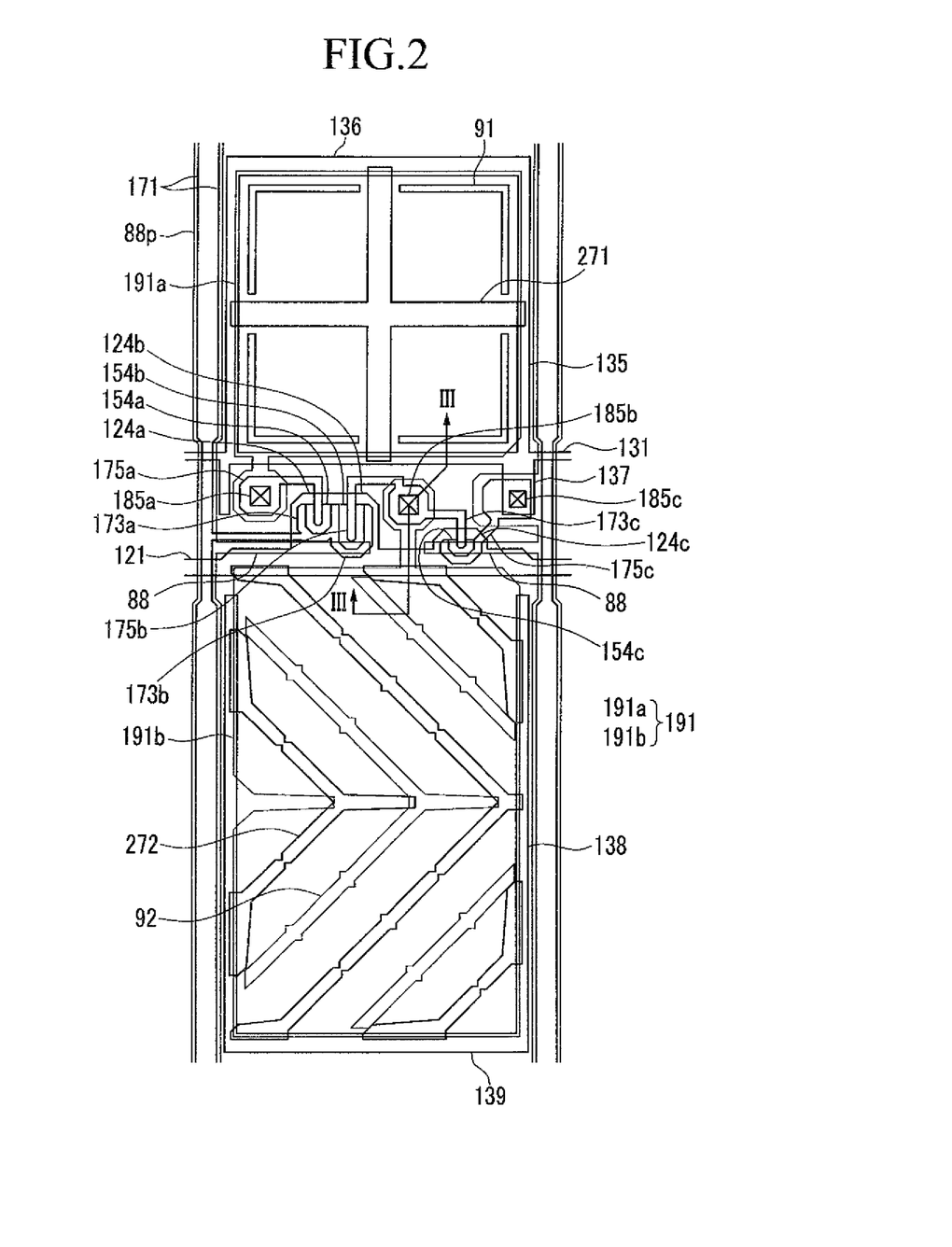
FIG. 2 is a top plan view of the liquid crystal display of FIG. 1, according to an exemplary embodiment of the present invention.
Figure 3:
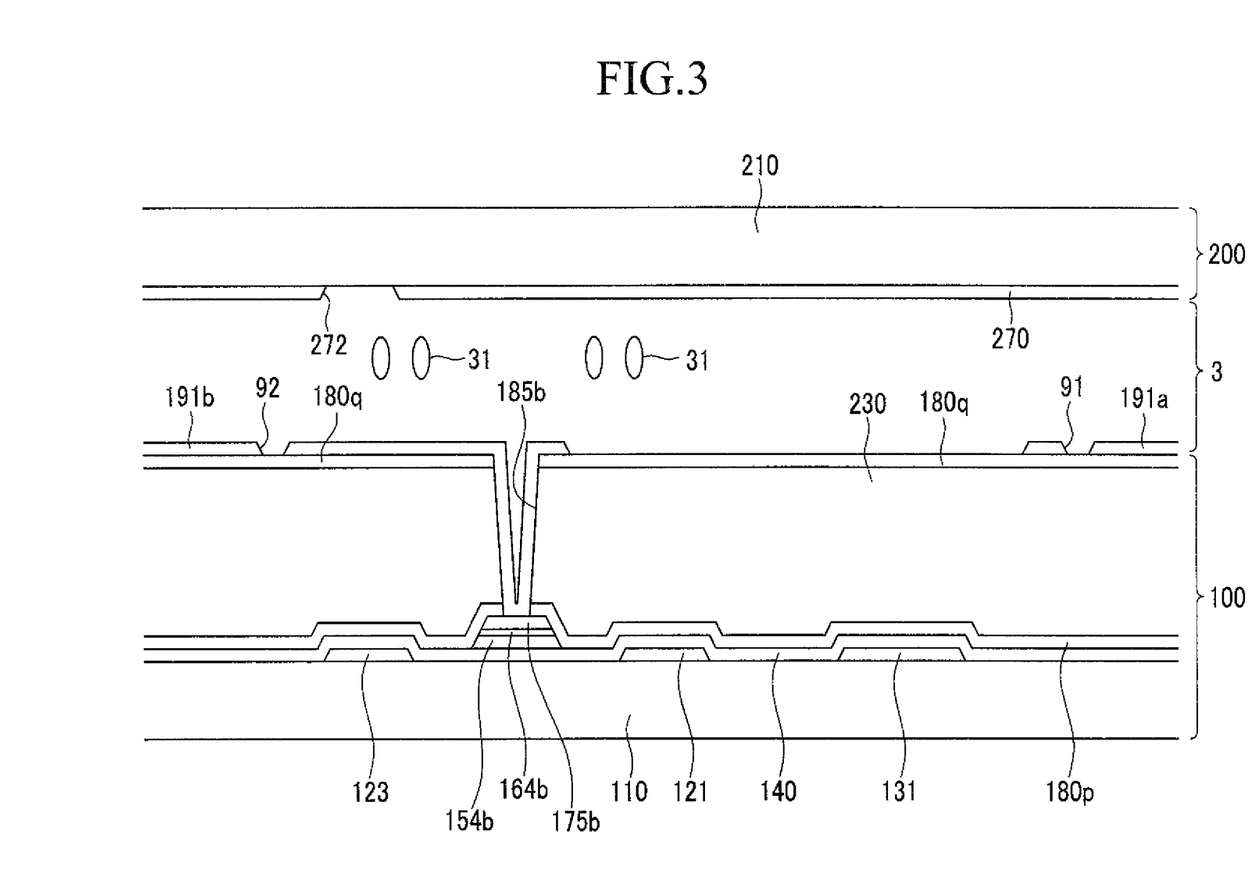
FIG. 3 is a cross-sectional view taken along line of the liquid crystal display shown in FIG. 2.

FIG. 2 is a top plan view of the liquid crystal display according to the exemplary embodiment shown in FIG. 1. FIG. 3 is a cross-sectional view of the liquid crystal display taken along line of FIG. 2.

Referring to FIGS. 2 and 3, the liquid crystal display according to an exemplary embodiment includes a lower display panel 100 and an upper display panel 200 that face each other, and a liquid crystal layer 3 interposed between the two display panels 100 and 200.

A gate line 121, a reference voltage line 131 and storage electrodes 135, 136, 138, and 139 are formed on an insulation substrate 110 made of, for example, transparent glass or plastic. The gate line 121 extends in a horizontal direction, or a substantially horizontal direction, and a gate signal is transferred via the gate line 121.

The gate line 121 includes a first gate electrode 124a, a second gate electrode 124b, a third gate electrode 124c, and a wide end portion which connects to another layer or an external driving circuit.

The reference voltage line 131 may extend parallel to, or substantially parallel to the gate line 121, and may have an expansion portion 137. The expansion portion 137 is connected to a third drain electrode 175c.

The reference voltage line 131 may include first storage electrodes 135 and 136 surrounding, or substantially surrounding a first subpixel electrode 191a.

A second subpixel electrode 191b may be surrounded by, or substantially surrounded by second storage electrodes 138 and 139.

A gate insulating layer 140 is formed on the gate line 121, the reference voltage line 131, and the storage electrodes 135, 136, 138 and 139.

A first semiconductor 154a, a second semiconductor 154b and a third semiconductor 154c are formed on the gate insulating layer 140. The first, second and third semiconductors 154a, 154b and 154c may be made of, for example, amorphous or crystalline silicon.

A plurality of ohmic contacts 164b are formed on the first semiconductor 154a, the second semiconductor 154b and the third semiconductor 154c. The ohmic contacts 164b may be omitted, for example, in an exemplary embodiment where the first, second and third semiconductors 154a, 154b and 154c are oxide semiconductors.

Data conductors 171, 173a, 173b, 173c, 175a, 175b and 175c including a data line 171, a first source electrode 173a, a second source electrode 173b, a third source electrode 173c, a first drain electrode 175a, a second drain electrode 175b, and a third drain electrode 175c are formed on the ohmic contact and the gate insulating layer 140.

The second drain electrode 175b is connected to the third source electrode 173c.

The first gate electrode 124a, the first source electrode 173a, and the first drain electrode 175a form a first thin film transistor Qa together with the first semiconductor 154a. A channel of the first thin film transistor Qa is formed in the semiconductor portion 154a between the first source electrode 173a and the first drain electrode 175a. Similarly, the second gate electrode 124b, the second source electrode 173b, and the second drain electrode 175b form a second thin film transistor Qb together with the second semiconductor 154b. A channel of the second thin film transistor Qb is formed in the semiconductor portion 154b between the second source electrode 173b and the second drain electrode 175b. The third gate electrode 124c, the third source electrode 173c, and the third drain electrode 175c form a third thin film transistor Qc together with the third semiconductor 154c. A channel of the third thin film transistor Qc is formed in the semiconductor portion 154c between the third source electrode 173c and the third drain electrode 175c.

A lower passivation layer 180p may be made of an inorganic insulator such as, for example, silicon nitride or silicon oxide, and is formed on the data conductors 171, 173a, 173b, 173c, 175a, 175b, and 175c, and the exposed portions of the semiconductors 154a, 154b, and 154c.

A color filter 230 is disposed on the lower passivation layer 180p. The color filter 230 is disposed in regions that do not include the first thin film transistor Qa, the second thin film transistor Qb, and the third thin film transistor Qc.

A light blocking member may be primarily disposed in regions that do not include the color filter 230, as well as regions including a portion of the color filter 230. The light blocking member may also be referred to as a black matrix, and prevents or reduces light leakage.

An upper passivation layer 180q is formed on the color filter 230 and the light blocking member. The upper passivation layer 180q may prevent the color filter 230 and the light blocking member from being lifted, and may suppress contamination of the liquid crystal layer 3 by an organic material such as a solvent flowing from the color filter. As a result, defects such as afterimages (e.g., ghosting or burn-in) that may occur when driving an image may be prevented or reduced.

A first contact hole 185a and a second contact hole 185b through which the first drain electrode 175a and the second drain electrode 175b are exposed are formed in the lower passivation layer 180p, the light blocking member, and the upper passivation layer 180q. A third contact hole 185c through which the expansion portion 137 of the reference voltage line 131 and the third drain electrode 175c are exposed is formed in the lower passivation layer 180p, the light blocking member, the upper passivation layer 180q, and the gate insulating layer 140.

A pixel electrode 191 including a first subpixel electrode 191a and a second subpixel electrode 191b, and a blocking electrode line 88p are formed on the upper passivation layer 180q. The pixel electrode 191 may be made of a transparent conductive material such as, for example, indium tin oxide (ITO) or indium zinc oxide (IZO), or a reflective metal such as, for example, aluminum, silver, chromium or an alloy.

The pixel electrode 191 includes the first subpixel electrode 191a and the second subpixel electrode 191b, which are separated from each other. The gate line 121 and the reference voltage line 131 are disposed between the first and second subpixel electrodes 191a and 191b, are disposed on and under the pixel region, and are adjacent to each other in a column direction. That is, one pixel region includes the first subpixel region having the first subpixel electrode 191a and the second subpixel region having the second subpixel electrode 191b, and the area of the second subpixel region may be larger than the area of the first subpixel region. For example, in an exemplary embodiment, the area of the second subpixel region may be about 1.5 times as large as the area of the first subpixel region.

The first subpixel electrode 191a and the second subpixel electrode 191b receive a data voltage through the first contact hole 185a and the second contact hole 185b from the first drain electrode 175a and the second drain electrode 175b, respectively. The first subpixel electrode 191a and the second subpixel electrode 191b to which the data voltage is applied generate an electric field in conjunction with the common electrode 270 of the upper display panel 200. The electric field determines a direction of the liquid crystal molecules 31 of the liquid crystal layer 3 between the pixel electrode 191 and the common electrode 270. The luminance of light passing through the liquid crystal layer 3 is changed according to the direction of the liquid crystal molecules 31.

The blocking electrode line 88p extends parallel to, or substantially parallel to the data line 171, and includes a blocking electrode 88 protruding toward the gate line 121. A portion of the blocking electrode line 88p may cover the third contact hole 185c through which the expansion portion 137 of the reference voltage line 131 and the third drain electrode 175c are exposed, and may electrically connect the expansion portion 137 of the reference voltage line 131 and the third drain electrode 175c.

A common electrode 270 is formed on an insulation substrate 210 made of, for example, transparent glass or plastic.

In an exemplary embodiment of the present invention, the liquid crystal display may include a light blocking member and a color filter 230 disposed on the insulation substrate 210.

An alignment layer may be formed on the inner surface of the display panels 100 and 200, and may be, for example, a vertical alignment layer.

A polarizer may be provided on the outer surfaces of the display panels 100 and 200, respectively. Transmissive axes of the two polarizers may be orthogonal to each other, and one transmissive axis of the axes may be parallel to, or substantially parallel to the gate line 121. In an exemplary embodiment, the polarizer may be disposed on only one outer surface of the two display panels 100 and 200.

The liquid crystal layer 3 has a negative dielectric anisotropy, and the liquid crystal molecules 31 of the liquid crystal layer 3 are aligned such that long axes thereof are vertical to the surfaces of the two display panels 100 and 200 in the absence of an electric field. Therefore, incident light does not pass through the crossed polarizers, but is blocked in a state in which there is no electric field.

At least one of the liquid crystal layer 3 and the alignment layer may include photoreactive material such as, for example, reactive mesogen.

The common electrode 270 includes a first cutout 271 having a cross shape formed in a region corresponding to the first subpixel electrode 191a, and the first subpixel electrode 191a includes a second cutout 91 formed along an edge thereof. The second subpixel electrode 191b includes a plurality of third cutouts 92, and the common electrode 270 includes a plurality of fourth cutouts 272 formed in a region corresponding to the second subpixel electrode 191b.

As described above, the first subpixel electrode 191a and the second subpixel electrode 191b to which the data voltage is applied generate an electric field in conjunction with the common electrode 270 of the upper display panel 200. As a result, the liquid crystal molecules 31 of the liquid crystal layer 3, which are vertically aligned with the surfaces of the pixel electrode 191 and the common electrode 270 in a state in which no electric field is applied, lie in a horizontal direction with respect to the surfaces of the pixel electrode 191 and the common electrode 270. The luminance of light passing through the liquid crystal layer 3 is changed according to the orientation of the liquid crystal molecules 31.

Figure 4:
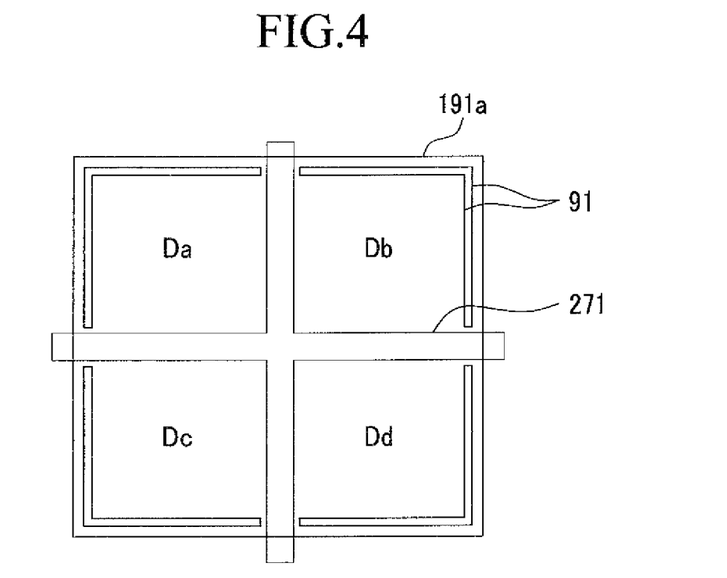
FIGS. 4 to 6 are top plan views showing basic regions of a field generating electrode of a liquid crystal display, according to exemplary embodiments of the present invention.
Figure 5:
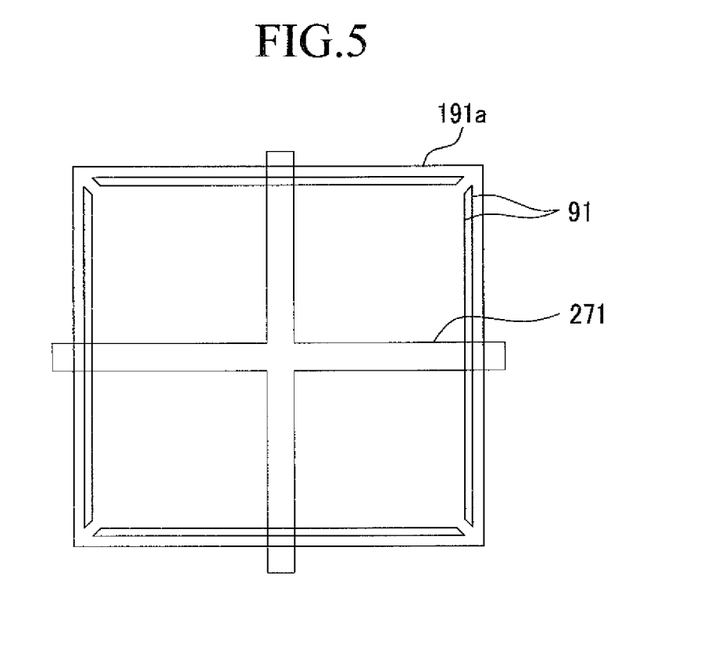
Figure 6:
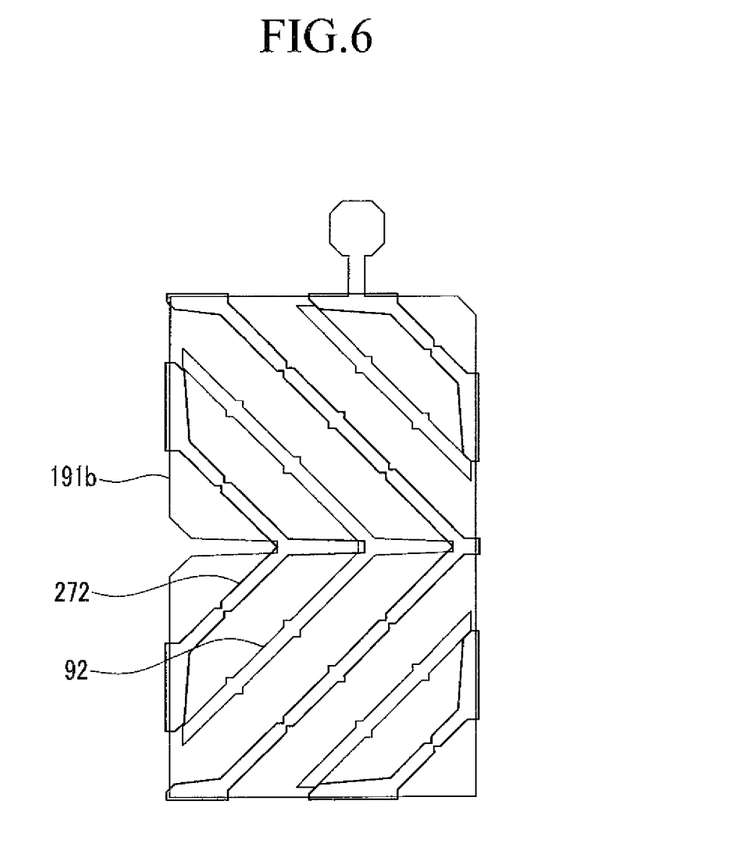

FIGS. 4 to 6 are top plan views showing a basic region of a field generating electrode of the liquid crystal display, according to exemplary embodiments of the present invention.

Referring to the exemplary embodiment shown in FIG. 4, the first basic region of the field generating electrode includes the first subpixel electrode 191a, the first cutout 271 of the common electrode 270 facing the first subpixel electrode 191a, and the second cutout 91 of the first subpixel electrode 191a, which surrounds, or substantially surrounds the first cutout 271 of the common electrode 270.

When the liquid crystal display is viewed from above, the basic region defined by the first cutout 271 of the common electrode 270 and the edge of the first pixel electrode 191a may be divided into a plurality of small regions Da, Db, Dc, and Dd. The plurality of small regions Da, Db, Dc, and Dd may be symmetrical to each other relative to the first cutout 271 of the common electrode 270.

The first cutout 271 of the common electrode 270 may have a cross shape when viewed in a flat plane form. The ends of the first cutout 271 protrude beyond the edge of the corresponding first subpixel electrode 191a.

The second cutout 91 of the first subpixel electrode 191a is substantially formed in a quadrangle ring shape along the edge of the first subpixel electrode 191a. The second cutout 91 is disconnected at portions corresponding to the ends of the first cutout 271 of the common electrode 270. The portions at which the second cutout 91 formed in the first subpixel electrode 191a are disconnected may be utilized as connection portions of the pixel electrode 191.

Although the cutout having the cross shape (e.g., the first cutout 271) is formed on the common electrode 270 in the exemplary embodiment shown in FIG. 4, the cutout may instead be formed on the pixel electrode 191. Further, in an exemplary embodiment, the cutout having the cross shape may be formed on both the common electrode 270 and the pixel electrode 191.

Referring to the exemplary embodiment shown in FIG. 5, the basic region of the field generating electrode may be similar to the exemplary embodiment described with reference to FIG. 4. However, unlike the exemplary embodiment shown in FIG. 4, the second cutout 91 of the first subpixel electrode 191a is formed substantially in a quadrangle ring shape along the edge of the first subpixel electrode 191a, and is disconnected at four portions at which the edges of the first subpixel electrode 191a extending in different directions meet each other. That is, the second cutout 91 is disconnected at the corner portions of the first subpixel electrode 191a. Further, the second cutout 91 of the first subpixel electrode 191a partially overlaps the first cutout 271 of the common electrode 270.

When the electric field is applied to the liquid crystal layer 3, the liquid crystal molecules 31 of the liquid crystal layer 3 are inclined from the four portions at which the edges of the first subpixel electrode 191a extending in different directions meet each other. The change in the orientation of the liquid crystal molecules 31 is caused by a fringe field generated by the edge of the first subpixel electrode 191a and the first cutout 271. As a result, the liquid crystal molecules 31 may be inclined in a direction substantially parallel to a direction toward the center of the first cutout 271 having the cross shape, and the total number of inclination directions of the liquid crystal molecules 31 in the basic region of the field generating electrode may be four. A viewing angle of the liquid crystal display may be increased by forming a plurality of inclination directions of the liquid crystal molecules in the basic region of the liquid crystal display.

Referring to the exemplary embodiment shown in FIG. 6, the second basic region of the field generating electrode includes the second subpixel electrode 191b, the third cutout 92 of the second subpixel electrode 191b, the common electrode 270 facing the second subpixel electrode 191b, and the fourth cutout 272 of the common electrode 270.

In an exemplary embodiment, the third cutout 92 of the second subpixel electrode 191b and the fourth cutout 272 of the common electrode 270 may be alternately disposed.

The second basic region of the field generating electrode may be divided into a plurality of domains by the edge of the second subpixel electrode 191b, the third cutout 92 of the second subpixel electrode 191b, and the fourth cutout 272 of the common electrode 270.

The number of third cutouts 92 of the second subpixel electrode 191b and the number of fourth cutouts 272 of the common electrode 270 may be changed according to exemplary embodiments of the present invention.

In an exemplary embodiment, the viewing angle of the liquid crystal display may be improved by forming domains of the first basic region formed by the first subpixel electrode 191a, and the second basic region formed by the second subpixel electrode 191b, such that the domains are different from each other.

The area of the second basic region of the field generating electrode may be larger than the area of the first basic region of the field generating electrode. For example, the area of the second basic region of the field generating electrode may be about 1.5 times as large as the area of the first basic region of the field generating electrode.

Figure 7:
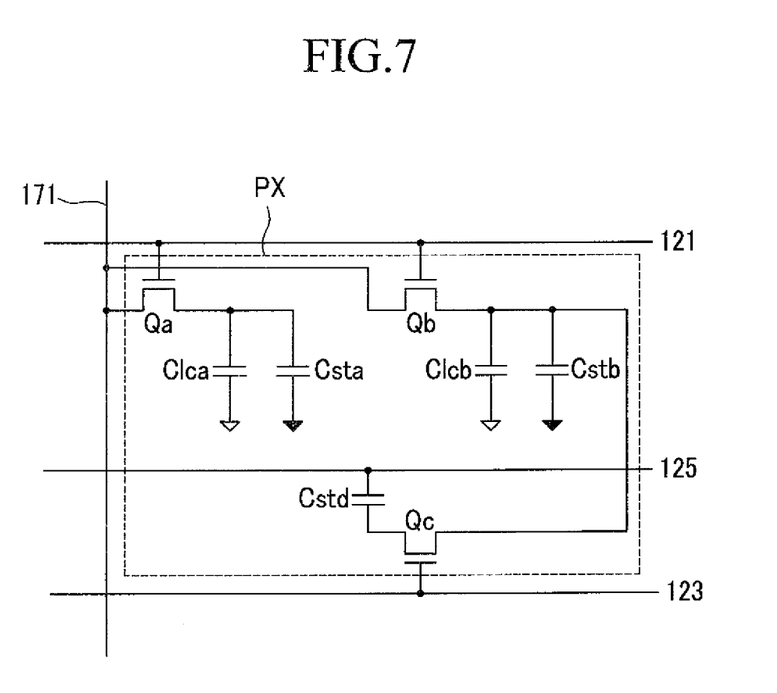
FIG. 7 is an equivalent circuit diagram of one pixel of a liquid crystal display, according to an exemplary embodiment of the present invention.
Figure 8:
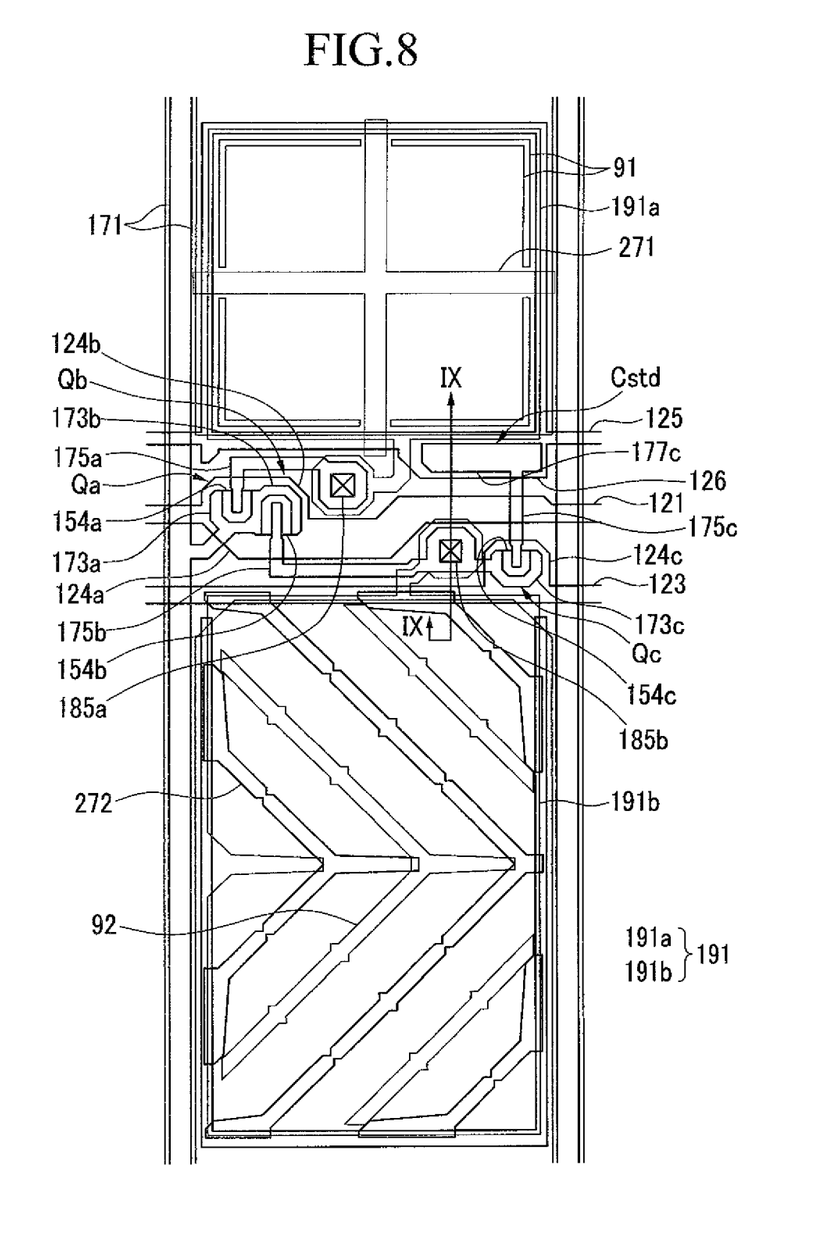
FIG. 8 is a top plan view of the liquid crystal display of FIG. 7, according to an exemplary embodiment of the present invention.
Figure 9:
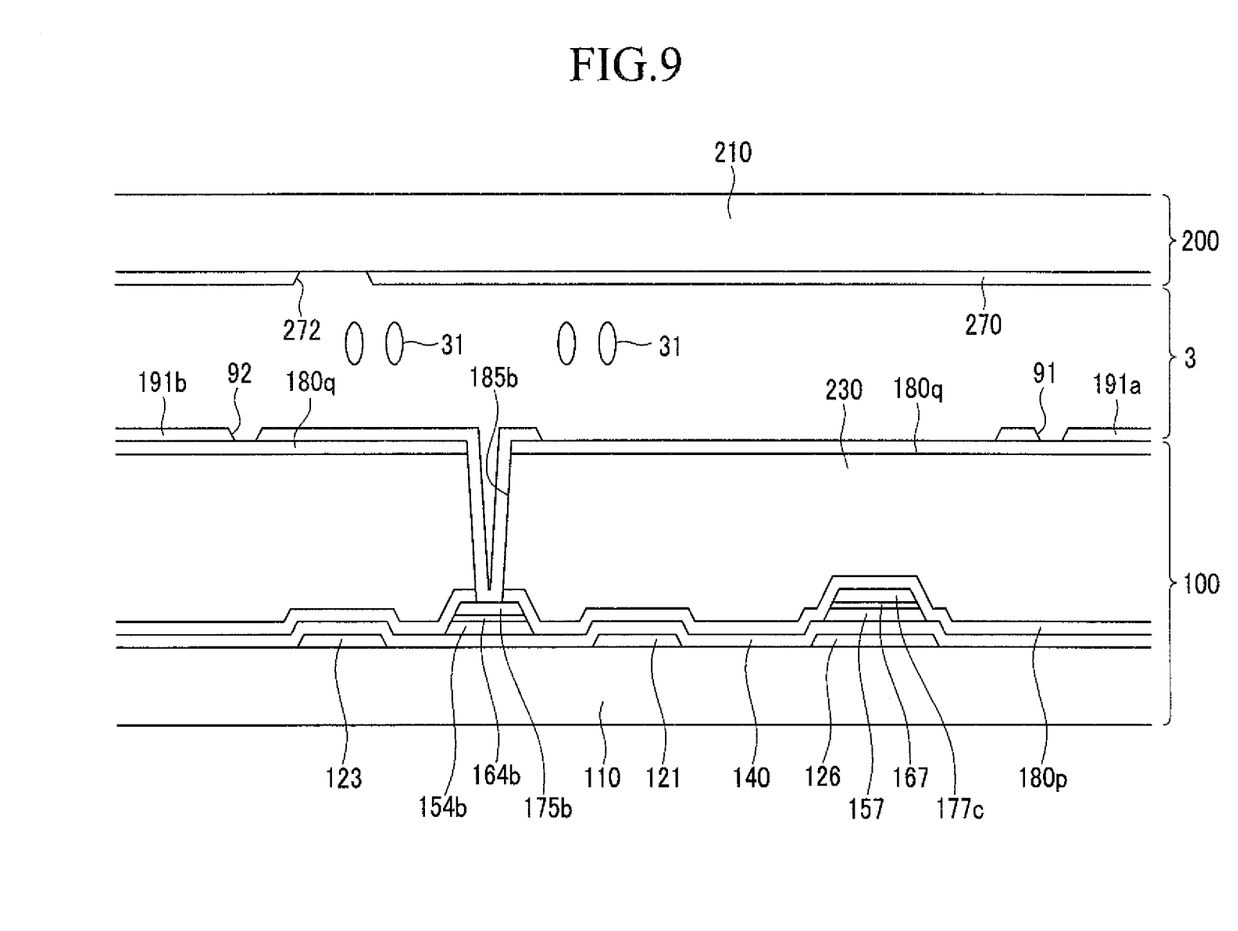
FIG. 9 is a cross-sectional view taken along line IX-IX of the liquid crystal display of FIG. 8.

FIG. 7 is an equivalent circuit diagram of one pixel of a liquid crystal display, according to an exemplary embodiment of the present invention. FIG. 8 is a top plan view of the liquid crystal display, according to an exemplary embodiment of the present invention. FIG. 9 is a cross-sectional view taken along line IX-IX of the liquid crystal display of FIG. 8.

Referring to FIG. 7, the liquid crystal display according to an exemplary embodiment includes a signal line including a gate line 121, a storage electrode line 125, a voltage drop gate line 123, and a data line 171, and a pixel PX connected thereto.

The pixel PX includes first, second, and third switching elements Qa, Qb and Qc, first and second liquid crystal capacitors Clca and Clcb, first and second storage capacitors Csta and Cstb, and a voltage drop capacitor Cstd. Hereinafter, the first, second, and third switching elements Qa, Qb, and Qc may be referred to as first, second, and third thin film transistors Qa, Qb, and Qc, respectively.

The first and second switching elements Qa and Qb are connected to the gate line 121 and the data line 171, respectively, and the third switching element Qc is connected to the voltage drop gate line 123.

The first and second switching elements Qa and Qb may each be a three terminal element such as, for example, a thin film transistor provided in a lower display panel 100. A control terminal of the first and second switching elements Qa and Qb is connected to the gate line 121, an input terminal of the first and second switching elements Qa and Qb is connected to the data line 171, and output terminals of the first and second switching elements Qa and Qb are connected to the first and second liquid crystal capacitors Clca and Clcb and the first and second storage capacitors Csta and Cstb.

The third switching element Qc may also be a three terminal element such as, for example, a thin film transistor provided in the lower display panel 100. A control terminal of the third switching element Qc is connected to the voltage drop gate line 123, an input terminal of the third switching element Qc is connected to the second liquid crystal capacitor Clcb, and an output terminal of the third switching element Qc is connected to the voltage drop capacitor Cstd.

The first and second liquid crystal capacitors Clca and Clcb are formed by overlapping the first and second subpixel electrodes 191a and 191b, which are connected to the first and second switching elements Qa and Qb, respectively, and the common electrode 270 of the upper display panel 200. The first and the second storage capacitors Csta and Cstb are formed by overlapping the storage electrode 139, the storage electrode line 125, and the first and the second subpixel electrodes 191a and 191b.

The voltage drop capacitor Cstd is connected to the output terminal of the third switching element Qc and the storage electrode line 125, and is formed by overlapping the storage electrode line 125 and the output terminal of the third switching element Qc provided in the lower display panel 100 with an insulator interposed therebetween.

A driving method of the liquid crystal display shown in FIG. 7 is hereinafter described.

When a gate-on signal is applied to the gate line 121, the first switching element Qa and the second switching element Qb connected to the gate line 121 are turned on. Accordingly, the data voltage applied to the data line 171 is applied to the first subpixel electrode 191a and the second subpixel electrode 191b through the turned-on first and second switching elements Qa and Qb. In this case, intensities of the data voltages applied to the first subpixel electrode 191a and the second subpixel electrode 191b are the same as each other, and thus, the voltages charged in the first and second liquid crystal capacitors Clca and Clcb are the same as each other. When a gate-off signal is applied to the gate line 121 and a gate-on signal is applied to the voltage drop gate line 123, the first switching element Qa and the second switching element Qb are turned off, and the third switching element Qc is turned on. Charges then move from the second subpixel electrode 191b through the third switching element Qc to the voltage drop capacitor Cstd. The charge voltage of the second liquid crystal capacitor Clcb is then lowered and the voltage drop capacitor Cstd is charged. Since the charge voltage of the second liquid crystal capacitor Clcb is lowered by the capacitance of the voltage drop capacitor Cstd, the charge voltage of the second liquid crystal capacitor Clcb becomes lower than the charge voltage of the first liquid crystal capacitor Clca.

The ratio of the voltage applied to the second subpixel electrode 191b to the voltage applied to the first subpixel electrode 191a may be between about 0.76 and about 0.80, and more specifically between about 0.77 and about 0.79.

In this case, the charge voltages of the two liquid crystal capacitors Clca and Clcb exhibit different gamma curves, and the gamma curve of one pixel voltage becomes a curve obtained by synthesizing the curves. The synthetic gamma curve at a direct viewing angle is set in accordance with a reference gamma curve that is most suitable at the direct viewing angle, and the synthetic gamma curve at a lateral viewing angle is set to be the closest to the reference gamma curve at the direct viewing angle. The viewing angle of the liquid crystal display may be improved by changing the image data as described above.

The liquid crystal display shown in FIG. 7 will be described in more detail with reference to FIGS. 8 and 9.

Referring to FIGS. 8 and 9, a liquid crystal display according to an exemplary embodiment includes the lower display panel 100 and the upper display panel 200 facing each other, the liquid crystal layer 3 interposed between the two display panels 100 and 200, and a pair of polarizers attached to the outer surfaces of the display panels 100 and 200.

A plurality of gate conductors including a plurality of gate lines 121, a plurality of voltage drop gate lines 123, and a plurality of storage electrode lines 125 are formed on the insulation substrate 110.

The gate line 121 and the voltage drop gate line 123 extend in a horizontal direction, or a substantially horizontal direction, and a gate signal is transferred via the gate line 121 and the voltage drop gate line 123. The gate line 121 includes a first gate electrode 124a and a second gate electrode 124b that protrude upward and downward, and the voltage drop gate line 123 includes a third gate electrode 124c that protrudes upward. The first gate electrode 124a and the second gate electrode 124b are connected to each other and form one protrusion portion.

The storage electrode line 125 extends in a horizontal direction, or a substantially horizontal direction, and a predetermined voltage such as a common voltage Vcom is transferred via the storage electrode line 125. The storage electrode line 125 includes a capacitance electrode 126 and a storage electrode overlapping the pixel electrode 191.

A gate insulating layer 140 is formed on the gate conductors 121, 123, and 125.

A plurality of semiconductors 154a, 154b and 154c, which may be made of, for example, amorphous or crystalline silicon, are formed on the gate insulating layer 140. The semiconductors 154a, 154b and 154c include first and second semiconductors 154a and 154b that extend toward the first and second gate electrodes 124a and 124b and are connected to each other, and a third semiconductor 154c connected to the second semiconductor 154b. The third semiconductor 154c extends to form a fourth semiconductor 157.

A plurality of ohmic contacts 164b and 167 are formed on the semiconductors 154a, 154b and 154c. For example, a first ohmic contact is formed on the first semiconductor 154a, and a second ohmic contact 164b and a third ohmic contact are formed on the second semiconductor 154b and the third semiconductor 154c, respectively. The third ohmic contact extends to form a fourth ohmic contact 167.

A data conductor including a plurality of data lines 171, a plurality of first drain electrodes 175a, a plurality of second drain electrodes 175b, and a plurality of third drain electrodes 175c is formed on the ohmic contacts 164b and 167.

The data line 171 transfers a data signal, extends in a vertical direction, or a substantially vertical direction, and crosses the gate line 121 and the voltage drop gate line 123. Each data line 171 includes a first source electrode 173a and a second source electrode 173b extending toward the first gate electrode 124a and the second gate electrode 124b.

The first drain electrode 175a, the second drain electrode 175b, and the third drain electrode 175c include a wide end portion and a rod-shaped end portion. The rod-shaped end portions of the first drain electrode 175a and the second drain electrode 175b are partially surrounded by the first source electrode 173a and the second source electrode 173b. One wide end portion of the second drain electrode 175b further extends to form a third source electrode 173c. The wide end portion 177c of the third drain electrode 175c overlaps the capacitance electrode 126 and forms the voltage drop capacitor Cstd. The rod-shaped end portion is partially surrounded by the third source electrode 173c.

The first, second, and third gate electrodes 124a, 124b, and 124c, the first, second, and third source electrodes 173a, 173b, and 173c, and the first, second, and third drain electrodes 175a, 175b, and 175c form first, second, and third thin film transistors Qa, Qb, and Qc together with the first, second, and third semiconductors 154a, 154b, and 154c. The channel of the thin film transistors is formed in each of the semiconductors 154a, 154b, and 154c between each of the source electrodes 173a, 173b, and 173c and each of the drain electrodes 175a, 175b, and 175c.

The semiconductors 154a, 154b, and 154c have substantially the same flat surface shape as the data conductors 171, 175a, 175b, and 175c and the ohmic contacts 164b and 167, except for a channel region disposed between the source electrodes 173a, 173b, and 173c and the drain electrodes 175a, 175b, and 175c. That is, a space exists between the source electrodes 173a, 173b, and 173c and the drain electrodes 175a, 175b, and 175c, and an exposed portion that is not covered by the data conductors 171, 175a, 175b, and 175c in the semiconductors 154a, 154b, and 154c.

A lower passivation layer 180p, which may be made of an inorganic insulator such as, for example, silicon nitride or silicon oxide, is formed on the data conductors 171, 175a, 175b, 175c and the exposed portion of the semiconductors 154a, 154b, and 154c.

A color filter 230 is disposed on the lower passivation layer 180p. The color filter 230 is disposed in regions that do not include the first thin film transistor Qa, the second thin film transistor Qb, and the third thin film transistor Qc.

A light blocking member may be primarily disposed in regions that do not include the color filter 230, as well as regions including a portion of the color filter 230. The light blocking member may also be referred to as a black matrix and may prevent light leakage.

An upper passivation layer 180q is formed on the color filter 230 and the light blocking member. The upper passivation layer 180q may prevent the color filter 230 and the light blocking member from being lifted, and may suppress contamination of the liquid crystal layer 3 by an organic material such as a solvent flowing from the color filter 230, thereby preventing or reducing defects such as afterimages (e.g., ghosting or burn-in) that may occur when driving an image.

First contact holes 185a and second contact holes 185b through which the wide end portion of the first drain electrode 175a and the wide end portion of the second drain electrode 175b are exposed are formed in the lower passivation layer 180p, the light blocking member, and the upper passivation layer 180q.

A plurality of pixel electrodes 191 are formed on the upper passivation layer 180q. Each pixel electrode 191 includes a first subpixel electrode 191a and a second subpixel electrode 191b that are separated from each other by gate lines 121 and 123 disposed therebetween. For example, each pixel electrode 191 is disposed on and under the pixel region with the gate lines 121 and 123 as the center thereof, and are adjacent to each other in a column direction. That is, one pixel region includes a first subpixel region including the first subpixel electrode 191a, and a second subpixel region including the second subpixel electrode 191b.

The ratio of the voltage applied to the second subpixel electrode 191b to the voltage applied to the first subpixel electrode 191a may be between about 0.76 and about 0.80, and more specifically between about 0.77 and about 0.79. Further, the area of the second subpixel region where the second subpixel electrode 191b is disposed may be larger than the area of the first subpixel region where the first subpixel electrode 191a is disposed. More specifically, the area of the second subpixel region may be about 1.5 times as large as the area of the first subpixel region.

The shapes of the first subpixel electrode 191a and the second subpixel electrode 191b may be similar to those of the liquid crystal displays according to the exemplary embodiments described with reference to FIGS. 2 to 6.

A common electrode 270 is formed on the insulation substrate 210.

The common electrode 270 has a first cutout 271 formed in a region corresponding to the first subpixel electrode 191a, and a plurality of fourth cutouts 272 formed in a region corresponding to the second subpixel electrode 191b.

The shapes of the cutouts 271 and 272 of the common electrode 270 may be similar to those of the liquid crystal displays according to the exemplary embodiments described with reference to FIGS. 2 to 6.

Figure 10:
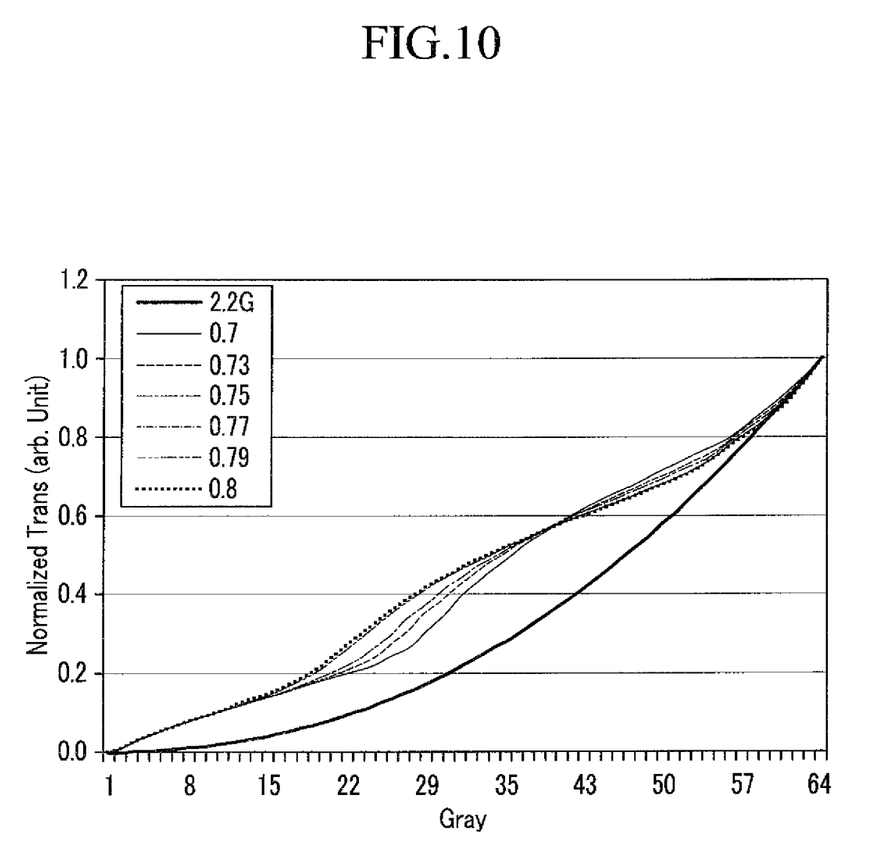
FIG. 10 is a graph showing transmittance according to a gray level in a liquid crystal display, according to exemplary embodiments of the present invention.

FIG. 10 is a graph showing transmittance according to a gray level, according to an experimental example utilizing exemplary embodiments of the present invention.

In FIG. 10, transmittance according to the gray level at a lateral viewing angle is measured, while a difference in voltage applied to the first subpixel electrode 191a and the second subpixel electrode 191b is changed and compared to the transmittance (G) according to the gray level at a direct viewing angle.

Referring to FIG. 10, when the ratio of the voltage applied to the second subpixel electrode 191b to the voltage applied to the first subpixel electrode 191a is set to about 0.76 to about 0.80, and more specifically, to about 0.77 to about 0.79, according to exemplary embodiments of the present invention, the transmittance according to the gray level transitions smoothly, and there are no periods where the transmittance according to the gray level includes either no change in transmittance, or rapid changes in transmittance. For example, when the ratio of the voltage applied to the second subpixel electrode 191b to the voltage applied to the first subpixel electrode 191a is set to 0.7 or 0.73, a period exists where transmittance is hardly changed according to a change in gray level at about 29 gray, and transmittance is rapidly increased as the gray level is increased. The gray may not be accurately displayed in the region where there is little or no change in transmittance, and colors may not be accurately displayed or may appear cloudy in regions when the transmittance is rapidly increased according to the gray level.

In exemplary embodiments of the present invention, when the ratio of the voltage applied to the second subpixel electrode 191b to the voltage applied to the first subpixel electrode 191a is set to about 0.76 to about 0.80, and more specifically, to about 0.77 to about 0.79, transmittance according to the gray level is smoothly changed (e.g., there are no periods during which there is no change, or a rapid change in transmittance according to the gray level). Accordingly, deterioration of image quality may be reduced or prevented.

Further, as described above, the viewing angle of the liquid crystal display according to exemplary embodiments of the present invention may be further widened by forming domains of the first basic region formed by the first subpixel electrode 191a, and the second basic region formed by the second subpixel electrode 191b, such that the domains are different from each other. As a result, an inclination direction of liquid crystal molecules of the liquid crystal layer for each domain may be separately adjusted, and the viewing angle of the display may be improved.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A liquid crystal display, comprising:
    a first substrate;
    a pixel electrode formed on the first substrate and comprising a first subpixel electrode disposed in a first subpixel region, and a second subpixel electrode disposed in a second subpixel region;
    a second substrate facing the first substrate; and
    a common electrode formed on the second substrate,
    wherein a first voltage applied to the first subpixel electrode and a second voltage applied to the second subpixel electrode are different from each other, and a ratio of the second voltage to the first voltage is about 0.76 to about 0.80,
    wherein the common electrode comprises a first cutout having a cross shape disposed in a region corresponding to the first subpixel electrode,
    wherein the first subpixel electrode comprises a second cutout formed in a quadrangle ring shape along an edge of the first subpixel electrode,
    wherein ends of the first cutout protrude beyond the edge of the first subpixel electrode in areas between disconnected portions of the second cutout which includes a bent portion.

2. The liquid crystal display of claim 1, wherein the ratio of the second voltage to the first voltage is about 0.77 to about 0.79.

3. The liquid crystal display of claim 1, wherein an area of the second subpixel region is larger than an area of the first subpixel region.

4. The liquid crystal display of claim 3, wherein the area of the second subpixel region is about 1.5 times as large as the area of the first subpixel region.

5. The liquid crystal display of claim 1, further comprising:
    a liquid crystal layer disposed between the first substrate and the second substrate,
    wherein liquid crystal molecules of the liquid crystal layer are substantially vertically aligned with the first substrate and the second substrate while an electric field is not present between the pixel electrode and the common electrode.

6. The liquid crystal display of claim 5, further comprising:
    an alignment layer disposed on at least one of the first substrate and the second substrate,
    wherein at least one of the liquid crystal layer and the alignment layer comprises a photoreactive material.

7. The liquid crystal display of claim 6, wherein the photoreactive material is a reactive mesogen.

8. The liquid crystal display of claim 1, wherein the second subpixel electrode comprises a plurality of third cutouts, the common electrode comprises a plurality of fourth cutouts disposed in a region corresponding to the second subpixel electrode, and the plurality of third cutouts and the plurality of fourth cutouts are alternately disposed.

9. A method of driving a liquid crystal display, comprising:
    applying a first voltage to a first subpixel electrode disposed on a pixel electrode in a first subpixel region; and
    applying a second voltage to a second subpixel electrode disposed on the pixel electrode in a second subpixel region,
    wherein the first voltage and the second voltage are different from each other, and a ratio of the second voltage to the first voltage is about 0.76 to about 0.80,
    wherein a common electrode comprises a first cutout having a cross shape disposed in a region corresponding to the first subpixel electrode,
    wherein the first subpixel electrode comprises a second cutout formed in a quadrangle ring shape along an edge of the first subpixel electrode,
    wherein ends of the first cutout protrude beyond the edge of the first subpixel electrode in areas between disconnected portions of the second cutout which includes a bent portion.

10. The method of claim 9, wherein the ratio of the second voltage to the first voltage is about 0.77 to about 0.79.

11. The method of claim 9, wherein an area of the second subpixel region is larger than an area of the first subpixel region.

12. The method of claim 11, wherein the area of the second subpixel region is about 1.5 times as large as the area of the first subpixel region.

13. The method of claim 9, wherein the second subpixel electrode comprises a plurality of third cutouts, the common electrode comprises a plurality of fourth cutouts disposed in a region corresponding to the second subpixel electrode, and the plurality of third cutouts and the plurality of fourth cutouts are alternately disposed.

* * * * *